Dec. 2, 1958   J. BRIECHLE   2,862,515
CHECK VALVE
Filed Feb. 21, 1956
FIG. 1.
FIG. 4.
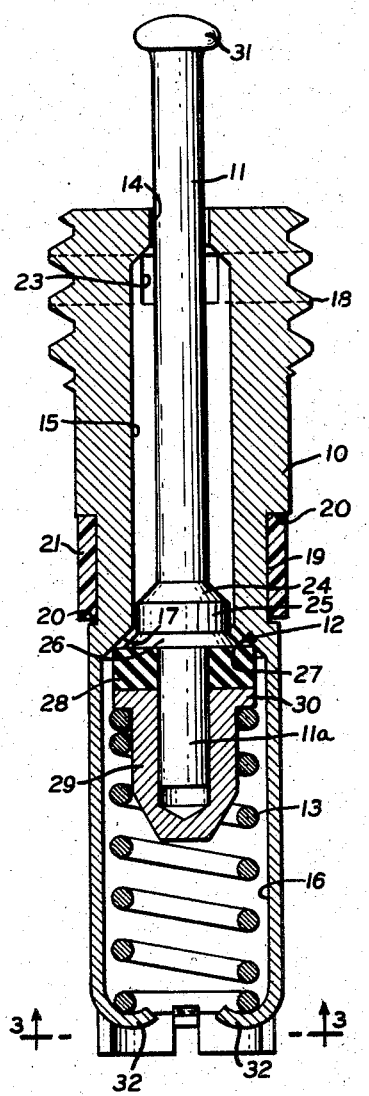
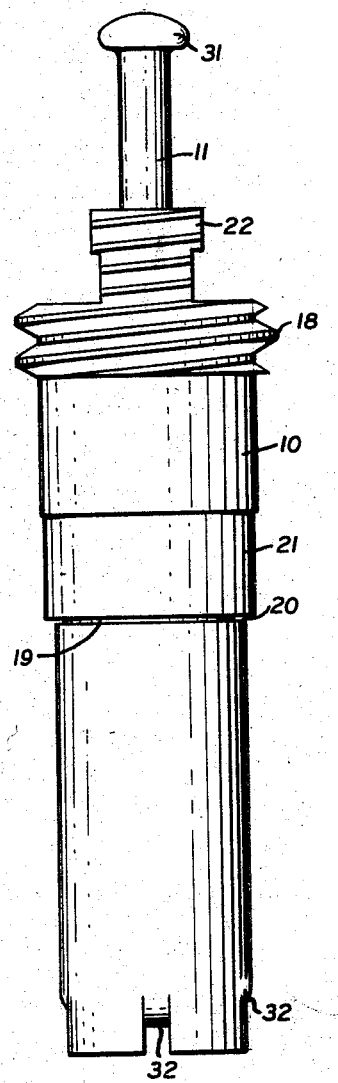
FIG. 2.
FIG. 3.
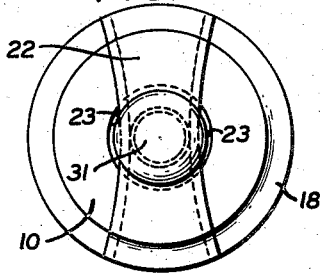
INVENTOR
JOSEPH BRIECHLE.
BY
Churchill, Rich, Waymouth & Engel
ATTORNEYS.

United States Patent Office 2,862,515
Patented Dec. 2, 1958

2,862,515

CHECK VALVE

Joseph Briechle, New Canaan, Conn., assignor to Scovill Manufacturing Company, Waterbury, Conn., a specially chartered corporation of Connecticut Application February 21, 1956, Serial No. 566,819

2 Claims. (Cl. 137—234.5)

The present invention relates to check valves and aims to provide certain improvements therein. More particularly it relates to check valve assemblies or valve cores for mounting within a tire valve stem and the like and wherein a fluid-tight seal is provided between a valve member and a valve seat member within the valve core, one of which members is deformable and the other of which is non-deformable.

An object of the invention is to provide a check valve or valve core of the type specified, wherein a fluid-tight seal will be provided at either relatively low pressure or extremely high pressure and wherein any deformation of the deformable member of the check valve at high pressure will be limited and thereby prevent a "set" in said deformable member which may adversely affect the fluid tightness of the valve.

A further object of the invention is to provide a check valve or valve core of the type specified, wherein the valve member comprises a deformable packing washer mounted in a manner to prevent the packing washer from blowing out under high pressure operating on the valve in either direction.

A further object of the invention is to provide a valve core of the type specified having a one-piece body which houses the valve and a compression spring for seating the valve and eliminates the necessity for a swivel connection in providing a leak-tight seal between the valve core and the casing into which said core is to be mounted.

The foregoing and other objects of the invention, not specifically enumerated, are accomplished by providing a valve check member comprising a tubular body having an internal valve seat and a guided movable valve pin or plunger upon which is slidingly mounted a packing supported by a retainer, which also floats on the valve pin and a compression spring which biases the packing retainer against the packing, and the latter against an enlargement on the valve pin and against the valve seat. The clamping action on the packing against the enlargement on the valve pin and onto the valve seat by the retainer prevents the packing from taking on a "set" and from blowing out under high pressure operating on the valve check in either direction. The operating parts of the valve are all enclosed and mounted in the body member which, in turn, can be mounted in a tire valve casing or other housing and by the use of a polyfluoroethylene resin gasket eliminates the need of a swivel connection to insure a fluid-tight seal with such housing. The invention will be better understood from the detailed description which follows, when considered in connection with the accompanying drawing, wherein:

Figure 1 is a diametrical axial section through a check valve or valve core embodying the invention, the valve pin being shown in elevation.

Fig. 2 is a top plan view of the valve shown in Fig. 1.

Fig. 3 is a sectional view of the valve taken along the line 3—3 of Fig. 1.

Fig. 4 is a side elevation of the valve taken at a right angle to Fig. 1.

Referring to the drawings, the check valve or valve core comprises a one-piece rigid or non-deformable tubular body or housing 10, a valve pin or plunger 11 guidingly movable within the body, said valve pin having mounted thereon intermediate its ends a check valve device indicated as a whole by the numeral 12, and a helical compression spring 13 biasing the valve into seating position.

The body 10 has a bore extending therethrough of different diameters 14, 15 and 16, there being a taper or conical shoulder 17, constituting the valve seat, connecting the bore portions 15 and 16. The body portion at its outer end is externally screw-threaded at 18, and below said screw-threads is formed with an annular recess 19 having substantially flat end walls 20 within which recess is mounted a tubular deformable packing 21 formed of synthetic resinous material which is not adversely affected by temperatures from —90° F. to 500° F. and which will not stick or bond to metal. Resinous materials of the character set forth are known under the trademark "Teflon" and "Wel-F," which are tetra fluoroethylene polymers. Preferably the tubular deformable packing 21 is cut from cylindrical tubing and forced over the lower portion of the body to seat within the recess. When so positioned, the packing 21 has an external diameter somewhat greater than the diameter of the body below the packing so that when the body 10 is inserted into a tire valve stem or other casing adapted to accommodate the check valve, the outer wall of the packing will be deformed into a complemental engagement with the tapered shoulder formed within such valve stem for receiving a packing to provide a fluid-tight seal between the check valve and the valve stem. The body portion at its top is formed with a tool-engaging portion or bridge 22 which is preferably formed by milling away opposite portions of the screw-threaded end 18 to provide openings 23 for the passage of fluid between the valve stem and the interior of the body portion 10.

The valve pin or plunger 11 is formed intermediate its ends and preferably nearer its inner end which is positioned within the body 10, with an enlargement 24 having a cylindrical portion 25 of but slightly smaller diameter than the bore portion 15 and an enlarged frusto-conical portion 26 having a taper corresponding to the taper on the valve seal 17 adapted to engage said seat under excessive pressure operating to seat the valve. The enlargement 24 has a flat bearing face 27. Slidingly mounted on the portion 11a of the valve pin below the enlargement is a plunger washer or packing 28, the hole through which is normally smaller than the diameter of the pin, and supporting said plunger washer is a washer retainer 29 which is floatingly mounted on the portion 11a of the valve pin. The retainer 29 at its washer-supporting end is formed with an outwardly extending flange 30 having a flat top face engaging the washer. The parts 24 to 30 may be said to constitute the check valve device 12. The valve pin 11 at its outer end may be peened over, as shown at 31, as is conventional, for engagement with a valve pin depresser on an inflating chuck, pressure gauge or the like.

The spring 13 at one end encircles the retainer 29 and bears against the flange 30 thereof and at its opposite end bears against a plurality of hook-like members 32 formed by shearing the lower end of the body and bending portions upwardly thereinto.

From the foregoing detailed description it will be apparent that the plunger washer or packing 28 on the inner end 11a of the valve pin is held in place by the retainer 29 under the force of the spring 13 which maintains the retainer against the plunger washer; automatically takes up any "set" of the washer; and also prevents leakage through the hole of the washer. The constant clamping action of the washer between the flat bearing face 27 on the enlargement of the valve pin and the flange 30 of the retainer also prevents the washer from blowing out under high pressure inflation or deflation.

It will be noted that the plunger washer 28 normally engages the valve seat 17 with a line or wedge contact which will provide a leak-tight seal for the check valve at relatively low pressures. If the pressure within the container to which the check valve is connected is increased, it will be appreciated that the plunger washer will be progressively deformed as the pressure increases until the frusto-conical portion 26 of the valve engages the valve seat 17. Although no seal is intended to be made by the engagement between the parts 26 and 17, a fluid-tight seal is provided by the deformation of the plunger washer 28 against the valve seat 17. The contact between the parts 26 and 17 will prevent extrusion of the washer 28 through the port or bore of the body portion leading outwardly from the valve seat 17.

From the foregoing detailed description and drawing, it will be apparent that there has been provided a check valve which is exceedingly simple in construction and accomplishes the various objects of the invention as set forth in the opening statement of this specification.

While there has been shown and described a preferred embodiment of the invention, it is to be understood that changes in details of construction may be resorted to within the range of mechanical and engineering skill without departing from the spirit of the invention as hereinafter claimed.

What is claimed is:

1. A valve check or valve core comprising a one-piece, rigid body having an axial bore therethrough, a shoulder between bore portions of different diameters providing a valve seat facing toward the inner end of the axial bore, a valve pin guided in said bore, said valve pin having intermediate its ends a valve device for engaging said valve seat, said valve device including a fixed, rigid enlargement on the pin, a deformable packing slidingly mounted on the pin adjacent the enlargement and a retainer for the packing floatingly mounted on said pin, said rigid enlargement being adapted for engagement with the valve seat after a predetermined amount of compressive deformation of the packing to limit such deformation in valve closing position, and a compression spring within the bore of the body having a force sufficient for biasing the retainer to move along the valve pin and urge said packing into sealing engagement with the valve seat, said deformable packing being formed of material having sufficient resistance to deformation to prevent said spring from causing said rigid enlargement to engage said seat.

2. A valve core according to claim 1 wherein the valve seat is tapered, the enlargement on the pin is axially spaced from the retainer by the packing and said enlargement has a complementally tapered part adapted for engagement with the valve seat.

References Cited in the file of this patent

UNITED STATES PATENTS

| 1,964,249 | Chase | June 26, 1934 |
| 2,451,276 | Crowley | Oct. 12, 1948 |

FOREIGN PATENTS

| 2,524 | Great Britain | Feb. 8, 1900 |
| 27,909 | Great Britain | Dec. 22, 1908 |
| 294,961 | Switzerland | Feb. 16, 1954 |